United States Patent
Sato et al.

(10) Patent No.: US 12,222,546 B2
(45) Date of Patent: Feb. 11, 2025

(54) OPTICAL WAVEGUIDE, METHOD FOR MANUFACTURING OPTICAL WAVEGUIDE, AND OPTICAL SEMICONDUCTOR DEVICE

(71) Applicant: Nippon Telegraph and Telephone Corporation, Tokyo (JP)

(72) Inventors: Tomonari Sato, Tokyo (JP); Takahiko Shindo, Tokyo (JP); Yuta Ueda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 114 days.

(21) Appl. No.: 17/915,416

(22) PCT Filed: Mar. 31, 2020

(86) PCT No.: PCT/JP2020/014859
§ 371 (c)(1),
(2) Date: Sep. 28, 2022

(87) PCT Pub. No.: WO2021/199297
PCT Pub. Date: Oct. 7, 2021

(65) Prior Publication Data
US 2023/0136090 A1 May 4, 2023

(51) Int. Cl.
*G02B 6/13* (2006.01)
*G02B 6/12* (2006.01)
*G02B 6/122* (2006.01)

(52) U.S. Cl.
CPC .......... *G02B 6/131* (2013.01); *G02B 6/1225* (2013.01); *G02B 2006/12078* (2013.01); *G02B 2006/12128* (2013.01); *G02B 2006/12173* (2013.01)

(58) Field of Classification Search
CPC .......... G02B 6/131; G02B 2006/12078; G02B 2006/12128; G02B 2006/12173; G02B 6/1225
See application file for complete search history.

(56) References Cited

U.S. PATENT DOCUMENTS

| 6,018,539 A | 1/2000 | Kimura et al. |
| 2009/0245298 A1* | 10/2009 | Sysak .................. B82Y 20/00 257/E33.068 |
| 2013/0064497 A1 | 3/2013 | Iwai et al. |

FOREIGN PATENT DOCUMENTS

| CA | 2463522 C | * | 3/2012 | ............. B82Y 20/00 |
| JP | H11112081 A | | 4/1999 | |

(Continued)

OTHER PUBLICATIONS

Marsh, "Quantum Well Intermixing," Semicond. Sci. Technol., vol. 8, Feb. 1993, IOP Publishing, Glasgow, UK. 20 pages.

*Primary Examiner* — Michelle R Connelly
(74) *Attorney, Agent, or Firm* — Slater Matsil, LLP

(57) ABSTRACT

An optical waveguide is an optical waveguide including a semiconductor quantum well structure, the optical waveguide including a first region in which the semiconductor quantum well structure is not disordered and a second region in which the semiconductor quantum well structure is disordered. The first region has a first bandgap wavelength, the second region has a second bandgap wavelength, and a region in which the semiconductor quantum well structure is disordered in such a manner that a bandgap wavelength continuously decreases from the first bandgap wavelength to the second bandgap wavelength is provided between the first region and the second region.

6 Claims, 16 Drawing Sheets

(56) References Cited

FOREIGN PATENT DOCUMENTS

| JP | 2013070027 A | 4/2013 |
|----|--------------|--------|
| JP | 2014003229 A | 1/2014 |

* cited by examiner

OPTICAL WAVEGUIDE, METHOD FOR MANUFACTURING OPTICAL WAVEGUIDE, AND OPTICAL SEMICONDUCTOR DEVICE

CROSS-REFERENCE TO RELATED APPLICATIONS

This patent application is a national phase filing under section 371 of PCT application no. PCT/JP2020/014859, filed on Mar. 31, 2020, which is incorporated herein by reference in its entirety.

TECHNICAL FIELD

The present invention relates to an optical waveguide, a method for manufacturing an optical waveguide and an optical semiconductor device that enable curbing light loss.

BACKGROUND

Semiconductor optical devices in which a light emission region including a quantum well structure (active region) and a region in which light released from the light emission region is guided (including modulation, reflection, etc.) (passive region) are integrated on the same semiconductor substrate have been used as light sources for, e.g., high-speed optical fiber communications or gas sensors each using an absorption line of a molecule.

In a case where the active region and the passive region are formed on the same semiconductor substrate in this way, it is necessary that light generated in the active region propagates through the passive region without being absorbed, and thus, in general, the passive region is formed using a material having a bandgap that is larger than that of the active region.

In order to form such materials having different bandgaps on the same substrate, an epitaxial growth technique called "butt-joint regrowth" is used. In butt-joint regrowth, materials having different bandgaps can be formed in a surface of the same substrate by forming an active region on the entire surface of the substrate, then removing a part of the active region, the part to be a passive region, and selectively epitaxially growing a material having a different bandgap to be the passive region in the part where the active region is removed.

Butt-joint regrowth enables forming arbitrary different materials in an active region and a passive region and thus has the advantage of a high degree of freedom in selection of materials. However, in addition to the necessity to perform semiconductor etching and epitaxial regrowth requiring a high level of expertise, the difference in material (e.g., a composition and a lattice constant of a crystal) between the active region and the passive region easily causes crystal defects or abnormal growth (e.g., failure in forming a layer). Furthermore, from the perspective of light propagation, in order for light to propagate from the active region to the passive region without loss (reflection and coupling loss), it is necessary to control respective film thicknesses and compositions of the materials in the regions with high accuracy.

Also, in order to form materials having different bandgaps on the same substrate, it is possible to use a method in which a part of an active region including a quantum well structure, the active region being formed in an entire surface, and the part to be a passive region, is subjected to quantum well disordering (for example, Non-Patent Literature 1). This method utilizes introduction of an impurity or the like to a quantum well structure via, e.g., diffusion or ion implantation, causing a change in composition between a quantum well layer and a barrier layer forming the quantum well structure (quantum well disordering) and thereby causing the quantum well layer and the barrier layer to turn into a bulk semiconductor layer having an average composition. In comparison with the quantum well structure, the bulk semiconductor layer resulting from the disordering of the quantum well structure has a large bandgap and thus can be used as a passive layer.

With this method, in comparison with butt-joint regrowth, a passive region is formed from an active region in the same layer structure, enabling curbing occurrence of, e.g., crystal defects at a boundary between the active region and the passive region and eliminating the need for controlling respective film thicknesses and compositions of materials of the regions. As a result, the active region and the passive region can be formed with high quality.

CITATION LIST

Non-Patent Literature

Non-Patent Literature 1: J. H. Marsh, "Quantum well intermixing", Semiconductor Science and Technology, vol. 8, p. 1136, 1993.

SUMMARY

Technical Problem

However, in butt-joint growth and quantum well disordering, a passive region having a large bandgap (small refractive index) in comparison with an active region is formed and thus discontinuity in refractive index (refractive index difference) occurs at a boundary between the active region and the passive region. This refractive index difference causes propagating light guided between the active region and the passive region to be reflected or to leak from the waveguide at the boundary. As a result, as illustrated in FIG. 16, loss corresponding to the refractive index difference occurs.

In the case of, for example, a semiconductor laser, light returning to the active region via reflection (return light) affects a phase condition for laser oscillation and causes, e.g., an increase in line width or mode skipping. Also, light leaked from the waveguide causes a decrease in laser light output. In this way, there is the problem of discontinuity in refractive index (bandgap) at the boundary between the active region and the passive region causing deterioration in a characteristic of the optical device.

In order to solve the above problem, an object of embodiments of the present invention is to provide an optical waveguide and an optical semiconductor device that enables curbing reflected light or leaked light from a boundary between an active region and a passive region without a decrease in efficiency of coupling of propagating light between the active region and the passive region and with excellent characteristics.

Means for Solving the Problem

In order to solve the aforementioned problem, an optical waveguide according to embodiments of the present invention is an optical waveguide including a semiconductor quantum well structure, the optical waveguide including: a first region in which the semiconductor quantum well structure is not disordered; and a second region in which the semiconductor quantum well structure is disordered, wherein the first region has a first bandgap wavelength, the second region has a second bandgap wavelength, and a third region in which the semiconductor quantum well structure is disordered in such a manner that a bandgap wavelength continuously decreases from the first bandgap wavelength to the second bandgap wavelength is provided between the first region and the second region.

Also, a method for manufacturing an optical waveguide according to embodiments of the present invention is a method for manufacturing an optical waveguide including a semiconductor quantum well structure, the optical waveguide including a first region in which the semiconductor quantum well structure is not disordered and a second region in which the semiconductor quantum well structure is disordered, the method including: a step of forming a selective growth mask and an opening portion in the first region and a region between the first region and the second region in a surface of a crystal including the semiconductor quantum well structure; a step of selectively growing a semiconductor crystal in the opening portion; a step of removing the selective growth mask; a step of forming an annealing mask in the second region and the region between the first region and the second region; a step of annealing the crystal with the annealing mask formed thereon; and a step of removing the annealing mask, wherein a ratio between a width of the selective growth mask and a width of the opening portion varies in the region between the first region and the second region.

Effects of Embodiments of the Invention

Embodiments of the present invention enable provision of an optical waveguide and an optical semiconductor device that enable curbing loss of propagating light and that have excellent characteristics.

DETAILED DESCRIPTION OF ILLUSTRATIVE EMBODIMENTS

First Embodiment

Figure 1:
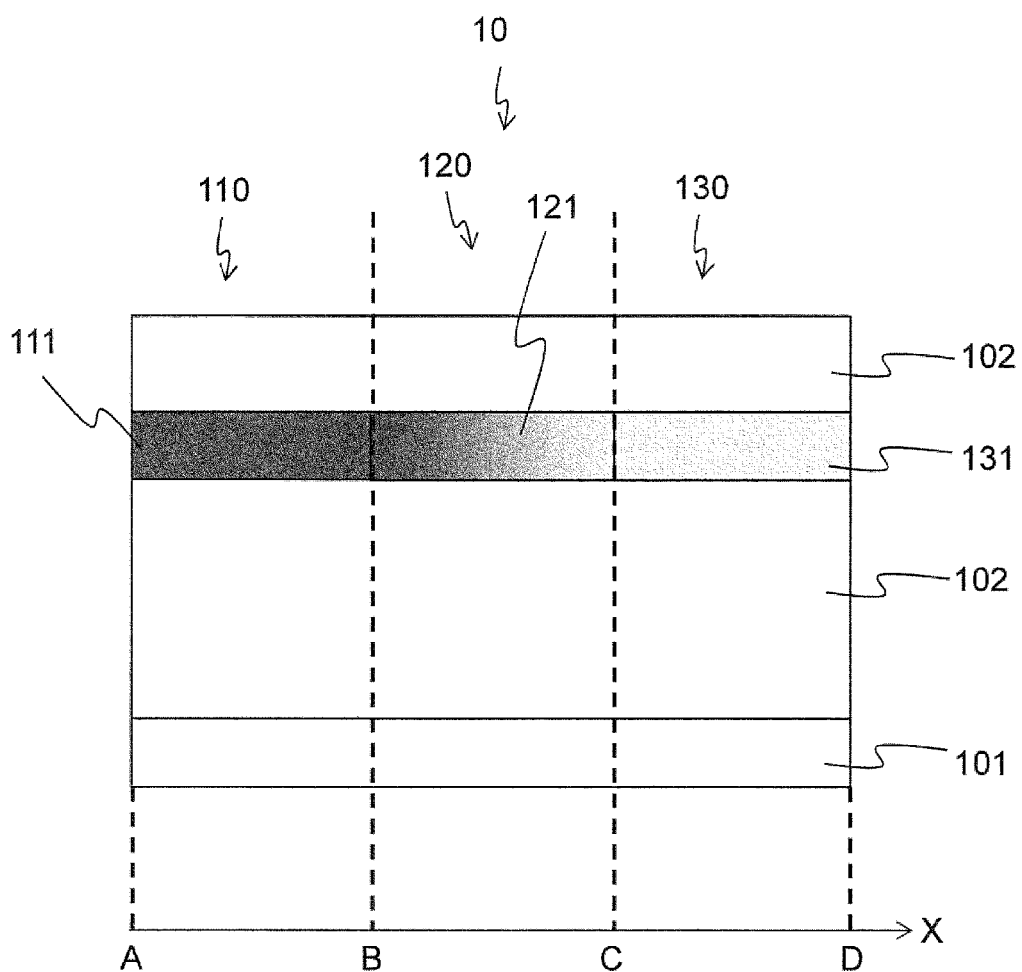
FIG. 1 is a sectional view of an optical waveguide according to a first embodiment of the present invention.
Figure 2:
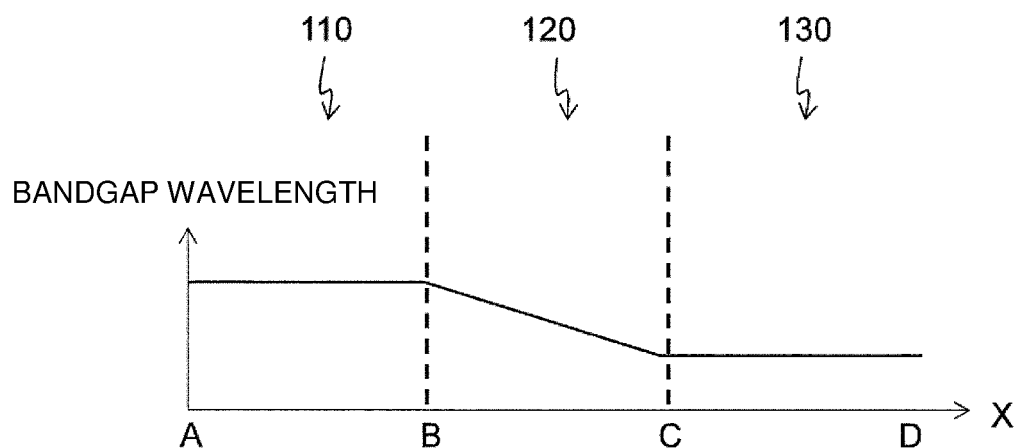
FIG. 2 is a diagram indicating bandgap wavelength variation in a wave-guiding direction of the optical waveguide according to the first embodiment of the present invention.

A first embodiment of the present invention will be described with reference to the drawings. FIG. 1 is a sectional view of an optical waveguide 10 according to the present embodiment. FIG. 2 indicates bandgap wavelength variation in a wave guiding direction of the optical waveguide 10 according to the present embodiment. The wave guiding direction is indicated by arrow X in the figures.

In the optical waveguide 10 according to the present embodiment, a light propagation layer formed of a quantum well structure in interposed between cladding layers 102 formed of a material that is the same as that of a substrate 101 is formed on the substrate 101. An active region no has the quantum well structure iii that is not disordered and a passive region 130 has a quantum well structure 131, all of which is disordered. An intermediate region 120 has a quantum well structure 121 disordered in such a manner that a bandgap wavelength continuously varies from a bandgap wavelength of the active region no to a bandgap wavelength of the passive region 130.

Here, a bandgap wavelength λg refers to a wavelength corresponding to a bandgap Eg and has the below relationship.

$\lambda g (\mu m) = 1.24/Eg(eV)$

A bandgap wavelength can be approximated by a peak wavelength of PL light emission, the peak wavelength being obtained by photoluminescence (hereinafter referred to as "PL") measurement, and can easily be evaluated, and thus, the below description is provided with a peak wavelength of PL light emission as a bandgap wavelength.

In the present embodiment, MOVPE using a reacting furnace with a pressure reduced to 50 Torr is used for crystal growth. For a group-III raw material, trimethylindium (TMIn) or triethylgallium (TEGa) is used, and for a group-V raw material, phosphine ($PH_3$) or arsine ($AsH_3$) is used. For a raw material of Zn, which functions as a p-type impurity, diethylzinc (DEZn) is used and for a raw material of Si, which functions as an n-type impurity, monosilane (SiH$_4$) is used.

For evaluation of structural characteristics of a grown crystal, an X-ray diffraction device manufactured by Philips is used. For evaluation of optical characteristics, PL measurement using a laser having a wavelength of 532 nm as a light source is performed at room temperature (25° C.).

Figure 3:
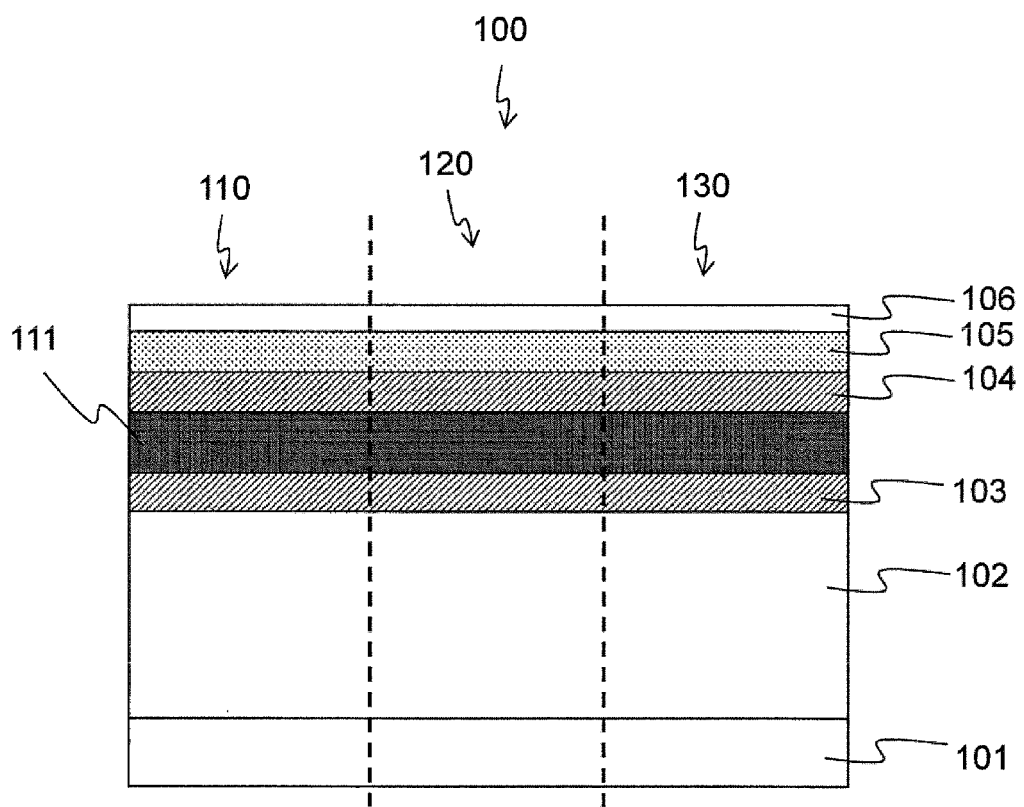
FIG. 3 is a sectional view of a crystal used for manufacturing the optical waveguide according to the first embodiment of the present invention.

FIG. 3 is a sectional view of a crystal 100 used for manufacturing the waveguide according to the present embodiment. An n-type InP cladding layer 102 (film thickness: 500 nm) with Si doped at a concentration of $1 \times 10^{18}$ cm$^3$, a non-doped InGaAsP optical confinement layer (film thickness: 100 nm) 103 having a bandgap wavelength of 1.3 µm, an InAs/InGaAs multi-quantum well structure (MQW) 111 consisting of six InAs well layers (film thickness: 5 nm) and seven InGaAs barrier layers (film thickness: 20 nm), a non-doped InGaAsP optical confinement layer (film thickness: 100 nm) 104 having a bandgap wavelength of 1.3 µm, a non-doped InGaAsP optical confinement layer (film thickness: 100 nm) 105 having a bandgap wavelength of 1.1 µm, and a p-type InP capping layer 106 (film thickness: 50 nm) with Zn doped at a concentration of $5 \times 10^{17}$ cm$^3$ are sequentially stacked on an n-type InP substrate 101.

An intermediate region 120 and a passive region 130 are formed by the crystal 100 being subjected to quantum well disordering. In usual quantum well disordering, when impurity diffusion or ion implantation, which induces quantum well disordering, is performed, a SiO$_2$ film is formed only on a surface of the active region no. As a result, in the active region no, the quantum well is not disordered, and in a region in which the SiO$_2$ film is not formed, the quantum well structure 111 is disordered and becomes a passive region 130. Therefore, no region (intermediate region 120) having a bandgap wavelength between those of the active region 110 and the passive region 130 can be formed.

In the present embodiment, the intermediate region 120 whose bandgap wavelength varies between those of the active region no and the passive region 130 is formed by controlling crystal defect diffusion, which induces quantum well disordering, using an InP layer formed by selective growth. The details will be described below.

Figure 4:
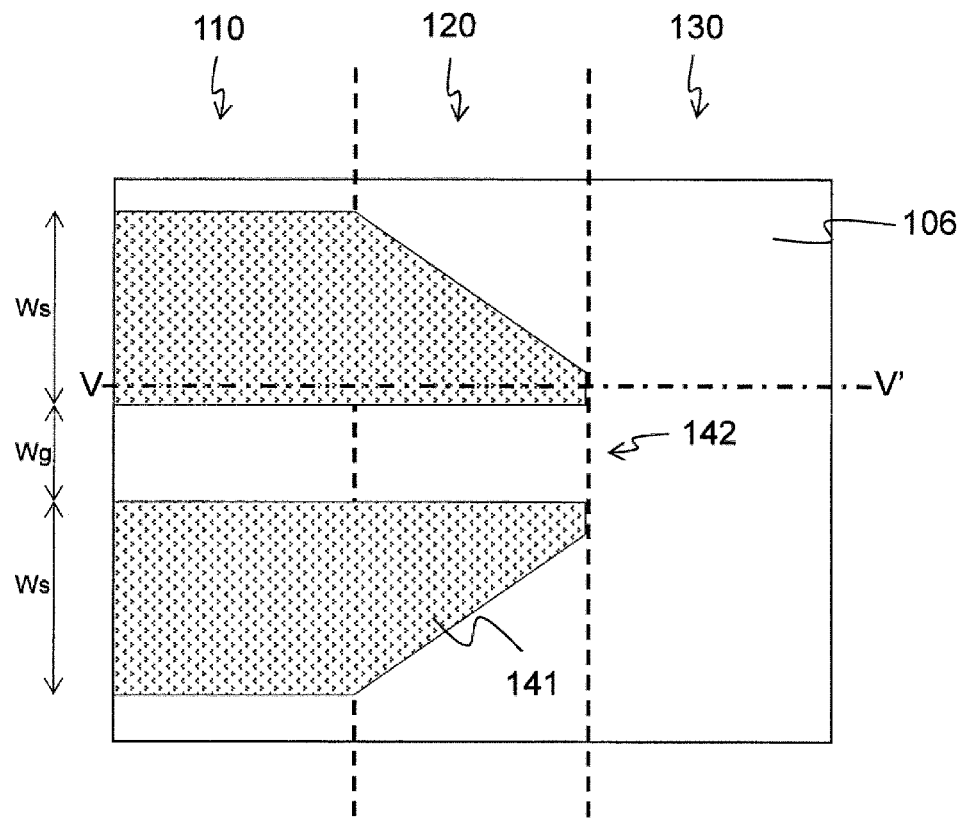
FIG. 4 is a top view of the crystal with $SiO_2$ selective growth masks formed thereon in the first embodiment of the present invention.
Figure 5:
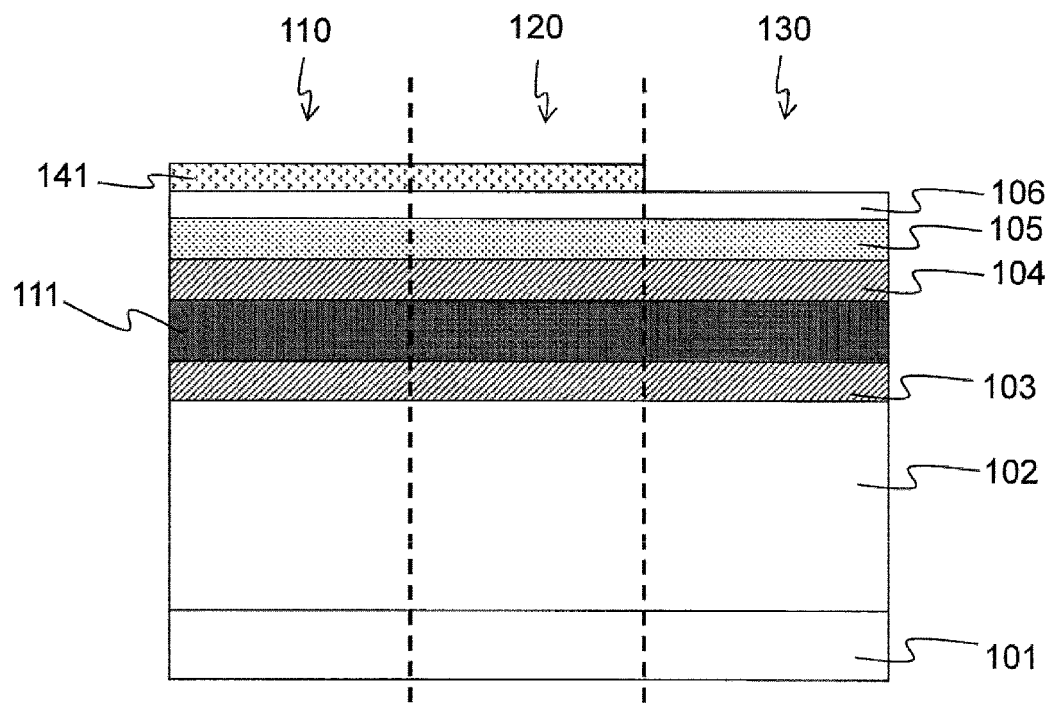
FIG. 5 is a sectional view taken along line V-V' of FIG. 4 illustrating the crystal with the $SiO_2$ selective growth masks formed thereon in the first embodiment of the present invention.

First, SiO$_2$ selective growth masks 141 are formed on a surface of the crystal. FIGS. 4 and 5 are a top view of the crystal with the SiO$_2$ masks 141 formed thereon, the SiO$_2$ masks 141 being used for quantum well disordering, in the present embodiment and is a sectional view along line V-V' in FIG. 4, respectively. The SiO$_2$ masks 141 are formed by stacking a SiO$_2$ film on the surface of the crystal using a usual method and processing the SiO$_2$ film using photolithography.

A width Ws of each SiO$_2$ mask 141 is 250 µm in the active region no and is continuously varied from 250 µm to 10 µm in the intermediate region 120. On the other hand, no mask is formed in the passive region 130. Also, a length of the intermediate region 120 (distance between the active region no and the passive region 130) is 20 µm.

A width (Wg) of a region (hereinafter referred to as "opening portion") 142 interposed between the SiO$_2$ masks 141 is 40 µm.

Next, a p-type InP layer with Zn doped at a concentration of $5 \times 10^{17}$ cm$^3$ is selectively grown in the opening portion 142 on the crystal surface with the SiO$_2$ masks 141 formed thereon. In this selective growth, InP is grown only in the opening portion 142.

Here, the doping concentration of Zn is not limited to $5 \times 10^{17}$ cm$^3$ and may be another concentration. Also, an n-type InP layer may be selectively grown by doping e.g., Si or Se other than Zn or a non-doped InP layer may be selectively grown.

Figure 6:
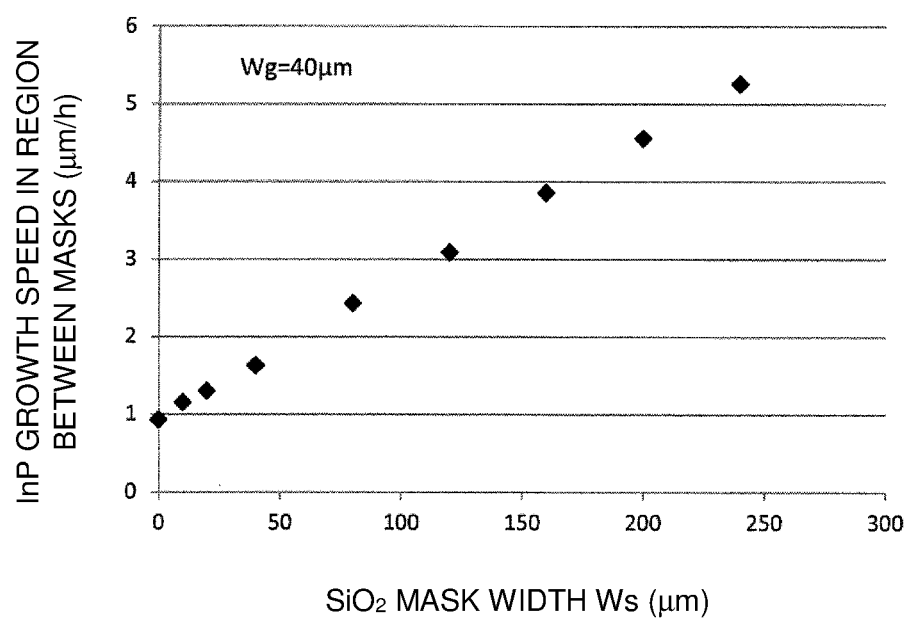
FIG. 6 is a diagram indicating dependency of a growth speed of an InP selectively grown layer on a width (Ws) of each $SiO_2$ selective growth mask in the first embodiment of the present invention.

FIG. 6 indicates dependency of a growth speed of the InP selectively grown layer on the width (Ws) of the SiO$_2$ masks 141. In selective growth of InP, raw material species obtained by, e.g., decomposition of a raw material gas, the raw material species coming onto the SiO$_2$ masks 141, migrates on the SiO$_2$ masks 141 and contributes to the growth of InP in the opening portion 142.

As a result, an epitaxial growth speed of InP selectively grown in the opening portion 142 increases in comparison with a case of crystal growth on a surface with no SiO$_2$ mask 141. Therefore, the growth speed of the selective growth of InP increases along with an increase in width (Wm) of the SiO$_2$ masks 141.

Figure 7:
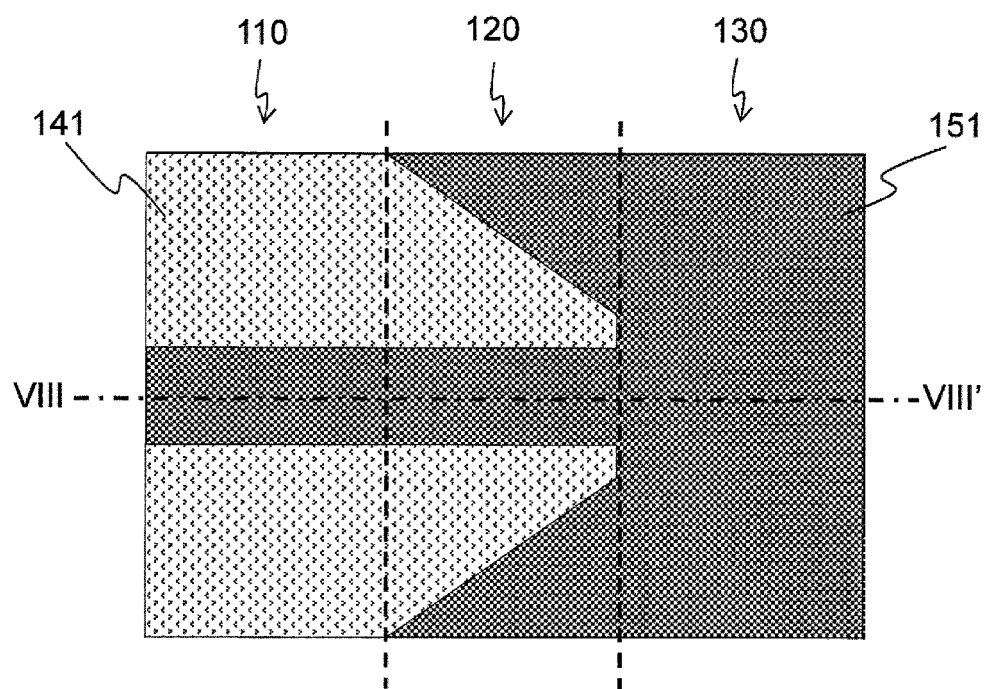
FIG. 7 is a top view of the crystal subjected to selective growth in the first embodiment of the present invention.
Figure 8:
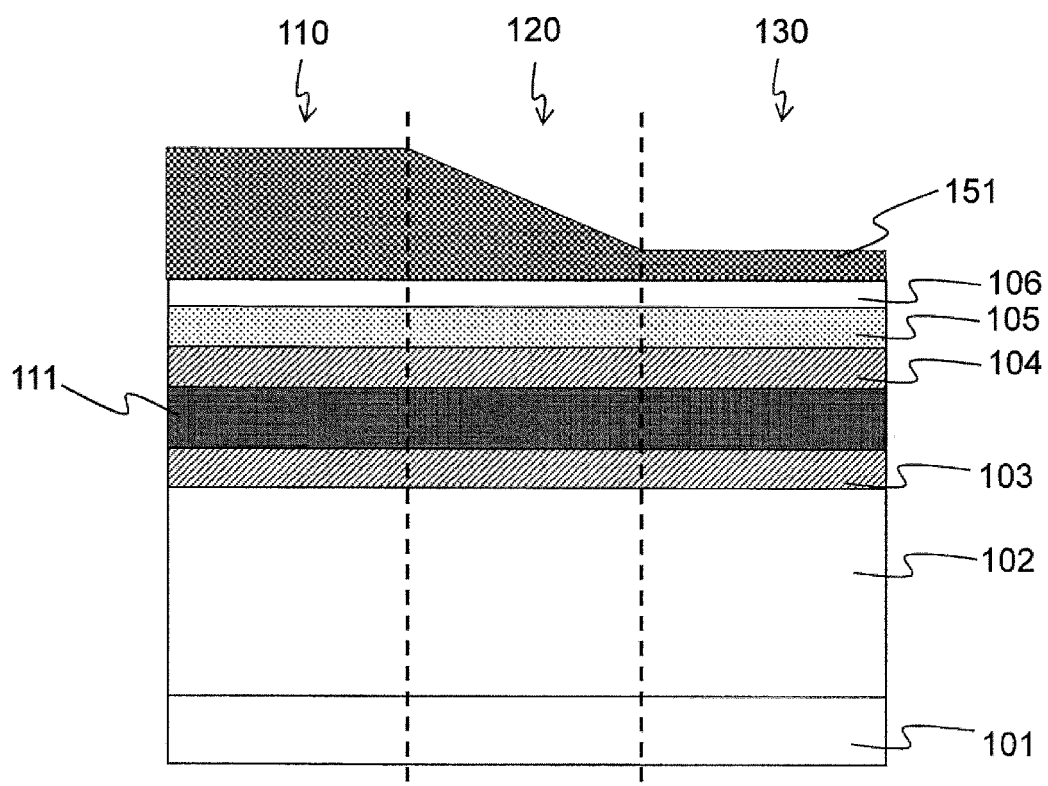
FIG. 8 is a sectional view taken along line VIII-VIII' of FIG. 7 illustrating the crystal subjected to selective growth in the first embodiment of the present invention.

FIGS. 7 and 8 are a top view of the crystal subjected to the selective growth and a sectional view along line VIII-VIII' in FIG. 7, respectively. Thicknesses of an InP layer 151 selectively grown in the active region 110, the intermediate region 120, and the passive region 130 are 250 nm, 250 to 50 nm, and 50 nm, respectively. Here, the thickness of the InP layer 151 in the intermediate region 120 continuously decreases from one end on the active region 110 side to the other end on the passive region 130 side.

Next, after removal of the SiO$_2$ selective growth masks 141 used for the selective growth, a SiO$_2$ film (thickness: 300 nm) for annealing is formed on the entire crystal surface via sputtering.

Figure 9:
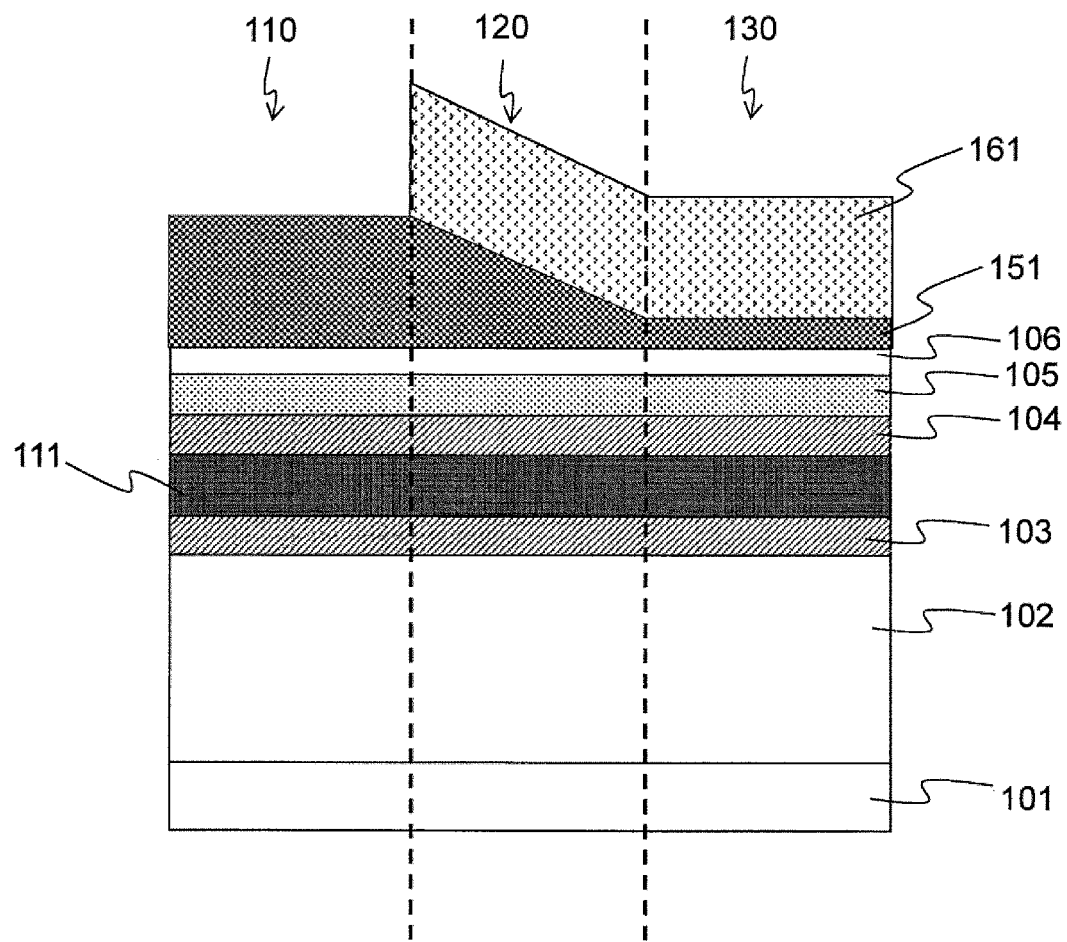
FIG. 9 is a sectional view of the crystal with a $SiO_2$ annealing mask formed in the first embodiment of the present invention.

Next, a SiO$_2$ annealing mask 161 is formed by removing a part of the SiO$_2$ film, the part being in a region not to be subjected to quantum well disordering (active region 110). FIG. 9 is a sectional view of the crystal with the SiO$_2$ annealing mask 161 formed thereon.

Next, this crystal is subjected to ten-minute thermal treatment (rapid thermal annealing, which is hereinafter referred to as "RTA") at 550° C. under a nitrogen atmosphere.

Through the above process, quantum well structure disordering is performed in the regions provided with the SiO$_2$ annealing mask 161. Quantum well disordering is considered to occur due to crystal defects, such as vacant lattice points or interstitial atoms, occurring at an interface between the SiO$_2$ annealing mask 161 and the p-type InP capping layer 106 due to the RTA diffusing from the interface to the multi-quantum well structure (MQW) 111.

Figure 10:
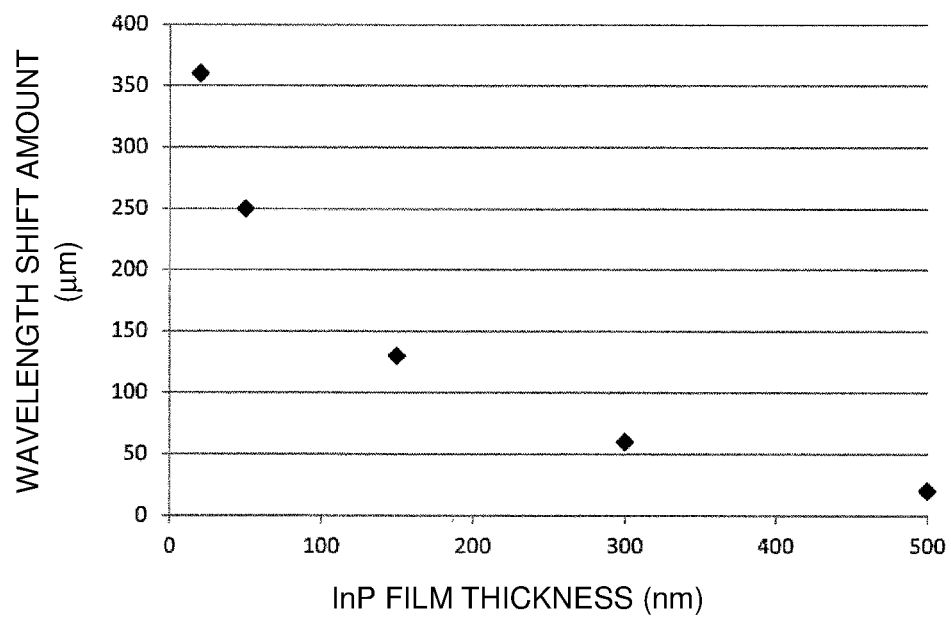
FIG. 10 is a diagram indicating a relationship between a thickness of an InP layer above a quantum well structure and an amount of wavelength variation in quantum well disordering in the first embodiment of the present invention.

FIG. 10 illustrates a relationship between a layer thickness of the InP (corresponding to the InP capping layer 106 and the InP selectively grown layer 151) above the quantum well structure in and an amount of variation in bandgap wavelength due to quantum well disordering. In this way, the amount of wavelength variation due to quantum well disordering depends on the thickness of the InP layer above the quantum well structure in, and when the InP layer is thin, the wavelength variation amount is large, and when the InP layer is thick, the wavelength variation amount is small.

A reason for the above is as follows. When the InP layer is thin, there are many lattice defects occurring at the aforementioned interface and diffusing, and reaching the MQW 111. As a result, the effect of quantum well disordering due to the lattice defects is large, and thus, the wavelength variation amount is large.

On the other hand, when the InP layer is thick, there are few lattice defects reaching the MQW 111. As a result, the effect of quantum well disordering due to the lattice defects is small, and thus, the wavelength variation amount is small.

Figure 11:
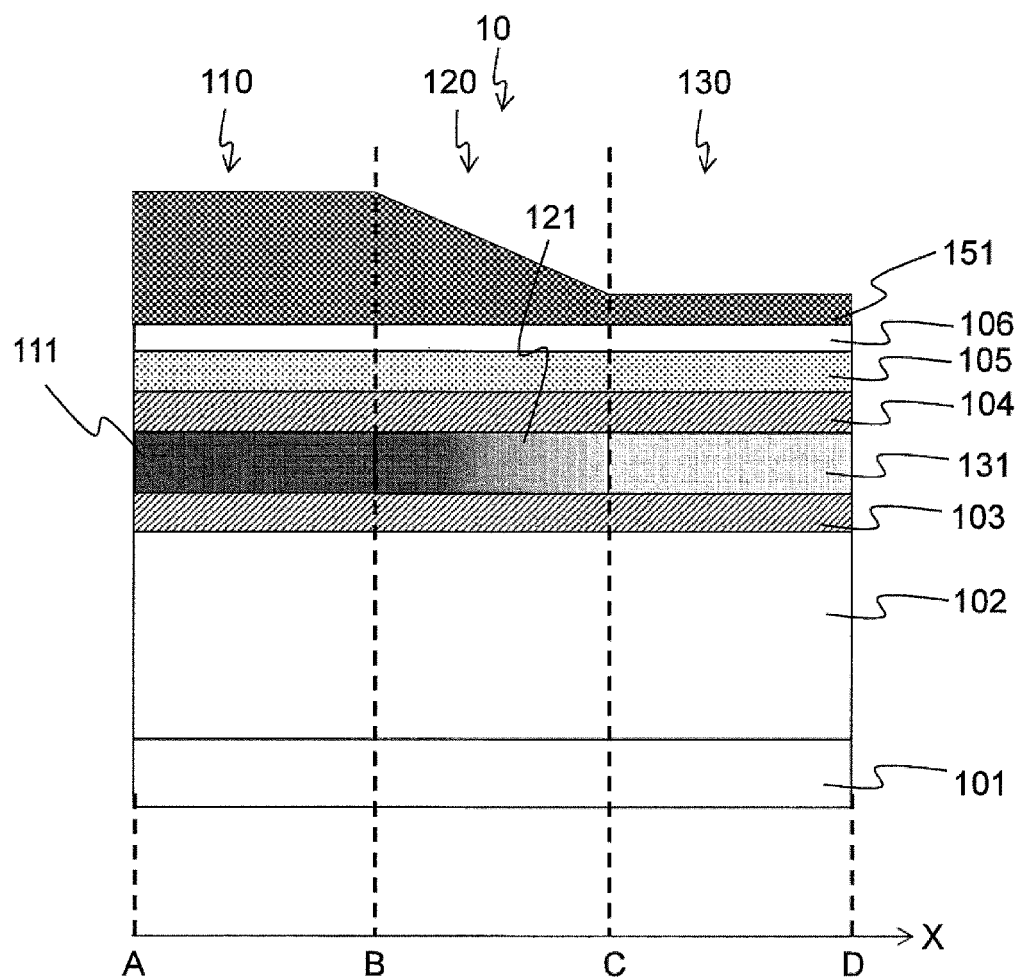
FIG. 11 is a sectional view of the crystal in which the quantum well structure is disordered in the first embodiment of the present invention.
Figure 12:
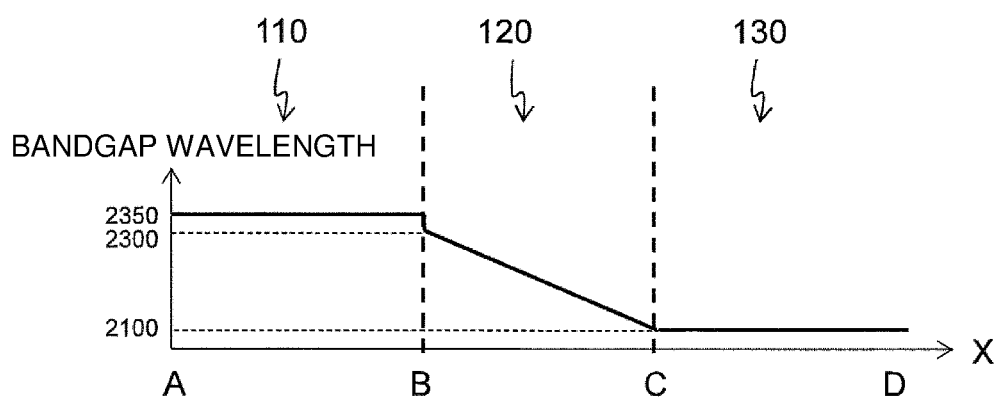
FIG. 12 is a diagram indicating variation in bandgap wavelength of the crystal in which the quantum well structure is disordered in the first embodiment of the present invention.

FIGS. 11 and 12 illustrate a section of the crystal with the quantum well structure 111 disordered and variation in bandgap wavelength, respectively. The bandgap wavelength of the active region 110 is constantly 2350 nm and the bandgap wavelength of the passive region 130 is constantly 2100 nm.

On the other hand, the bandgap wavelength of the intermediate region 120 decreases from 2300 nm at the one end on the active region 110 side (B in the graph) to 2100 nm at the other end on the passive region 130 side (C in the graph). In this way, the bandgap wavelength of the intermediate region 120 can continuously be varied in the direction from the active region no toward the passive region 130.

Here, a bandgap wavelength discontinuity part occurs at a boundary between the active region no and the intermediate region 120; however, such bandgap wavelength discontinuity is around one fifth of the wavelength variation amount in the passive region 130 and thus light loss caused by this discontinuity part can be ignored.

In the optical waveguide according to the present embodiment, the InAs/InGaAs multi-quantum well structure (MQW) 111 including InAs well layers and seven InGaAs barrier layers is used.

In a case where an optical waveguide is formed in the MQW 111 via conventional butt-joint growth, a growth surface (side surface) of the MQW is exposed to a $PH_3$ atmosphere, which is a growth gas, at a high temperature immediately before a start of crystal growth. At this time, the MQW 111 contains only As as a group-V material, and thus, crystal quality may deteriorate because of, e.g., replacement of As in the InAs/InGaAs growth surface and P in $PH_3$ with each other.

If an optical waveguide is formed (grown) in this deteriorated InAs/InGaAs-MQW growth surface, quality of an interface between the MQW and the optical waveguide deteriorates, resulting in an increase in light loss when light propagates.

As described above, in a case where an optical waveguide is formed in an active layer of, e.g., an MQW containing only As as a group-V material via conventional butt-joint growth, light loss may increase.

The optical waveguide according to the present embodiment and the method for manufacturing the same enable avoidance of light loss occurring when the aforementioned butt-joint growth is used.

Although in the present embodiment, the layer thickness of the selectively grown InP is varied by varying the width Ws of the selective growth masks 141 with the width Wg of the opening portion 142 kept constant, the layer thickness of the selectively grown InP can be varied by varying the width Wg of the opening portion 142 with the width Ws of each selective growth mask 141 kept constant. Also, the layer thickness of the selectively grown InP can be varied by varying both the width Ws of each selective growth mask 141 and the width Wg of the opening portion 142.

In this way, the layer thickness of the selectively grown InP can be varied by varying a ratio between the width Ws of each selective growth mask 141 and the width Wg of the opening portion 142. However, in consideration of uniformity (flatness) of the layer thickness of the selectively grown InP, varying the width Ws of each selective growth mask 141 with the width Wg of the opening portion 142 kept constant is more desirable for ease of control.

Although in the present embodiment, each selective growth mask 141 is formed in such a manner that a distal end of the selective growth mask 141 in the intermediate region 120 reaches a boundary with the passive region 130, each selective growth mask 141 may be formed in such a manner that a distal end of the selective growth mask 141 falls inside the intermediate region 120. Each selective growth mask 141 just needs to be formed in a part of the intermediate region 120.

Also, in the present embodiment, the selective growth masks 141 are formed to grow InP thick in the active region no. Here, since no quantum well disordering occurs unless the annealing mask 161 is formed, there is no need to form the selective growth masks 141 to grow InP thick.

However, since the bandgap wavelength of the active region no may be affected by annealing, in consideration of bandgap wavelength continuity with the intermediate region 120, it is desirable to form the selective growth masks 141 to grow InP thick in the active region 110.

Also, although in the present embodiment, the annealing mask 161 is formed in the entire intermediate region 120, even in a case where the annealing mask 161 is formed not in the entirety but a part of the intermediate region 120, effects that are substantially the same as those of the present embodiment can be exerted as long as the bandgap wavelength in the intermediate region 120 can be varied. However, in consideration of bandgap wavelength continuity with the passive region 130, it is desirable that the annealing mask 161 in the intermediate region 120 be formed in contact with the annealing mask 161 in the passive region 130.

As above, the method for manufacturing the optical waveguide according to the present embodiment enables forming an optical waveguide in which a bandgap wavelength continuously varies in a direction from an active region toward a passive region in an intermediate region, by forming selective growth masks in parts of the intermediate region on a semiconductor crystal including a semiconductor quantum well structure and performing selective growth and then forming an annealing mask in a part of the intermediate region and the passive region and performing annealing.

Here, in a case where a region in which a semiconductor quantum well structure is not disordered (for example, an active region) is a first region and a region in which the semiconductor quantum well structure is disordered is a second region (for example, a passive region), an optical waveguide in which a bandgap wavelength continuously decreases from a first bandgap wavelength to a second bandgap wavelength between the first region and the second region can be formed by forming a selective growth mask and an opening portion in a region (for example, a part of an intermediate region) between the first region and the second region in a surface of a semiconductor crystal including the semiconductor quantum well structure and performing selective growth and then forming an annealing mask in the second region (for example, the passive region) and a region between the first region and the second region (for example, a part of the intermediate region) and performing annealing.

Therefore, in a case where light propagates in the optical waveguide according to the present embodiment, it is possible to curb light loss caused by the refractive index difference between the active region and the passive region.

Second Embodiment

A second embodiment of the present invention will be described with reference to the drawings. In the optical waveguide 10 according to the first embodiment, a bandgap wavelength discontinuity part occurs at the boundary between the active region 110 and the intermediate region 120. An optical waveguide 20 according to the present embodiment and a method for manufacturing the same are intended to avoid the bandgap wavelength discontinuity.

In the optical waveguide 20 according to the present embodiment and the method for manufacturing the same, manufacturing conditions such as configurations of a crystal, selective growth masks and an annealing mask used for manufacturing are substantially similar to those of the first embodiment. In the optical waveguide 20 according to the present embodiment, a substrate 201, an n-type InP cladding layer 202, a non-doped InGaAsP optical confinement layer 203, a non-doped InGaAsP optical confinement layer 204, a non-doped InGaAsP optical confinement layer 205, a p-type InP capping layer 206, an InAs/InGaAs multi-quantum well structure (MQW) 211, and an InP layer 251 correspond to the substrate 101, the n-type InP cladding layer 102, the non-doped InGaAsP optical confinement layer 103, the non-doped InGaAsP optical confinement layer 104, the non-doped InGaAsP optical confinement layer 105, the p-type InP capping layer 106, the InAs/InGaAs multi-quantum well structure (MQW) 111, and the InP layer 151, respectively, of the optical waveguide 10 of the first embodiment. The present embodiment is different from the first embodiment in a configuration of a part, around a boundary between an active region and an intermediate region, of an annealing mask.

Figure 13:
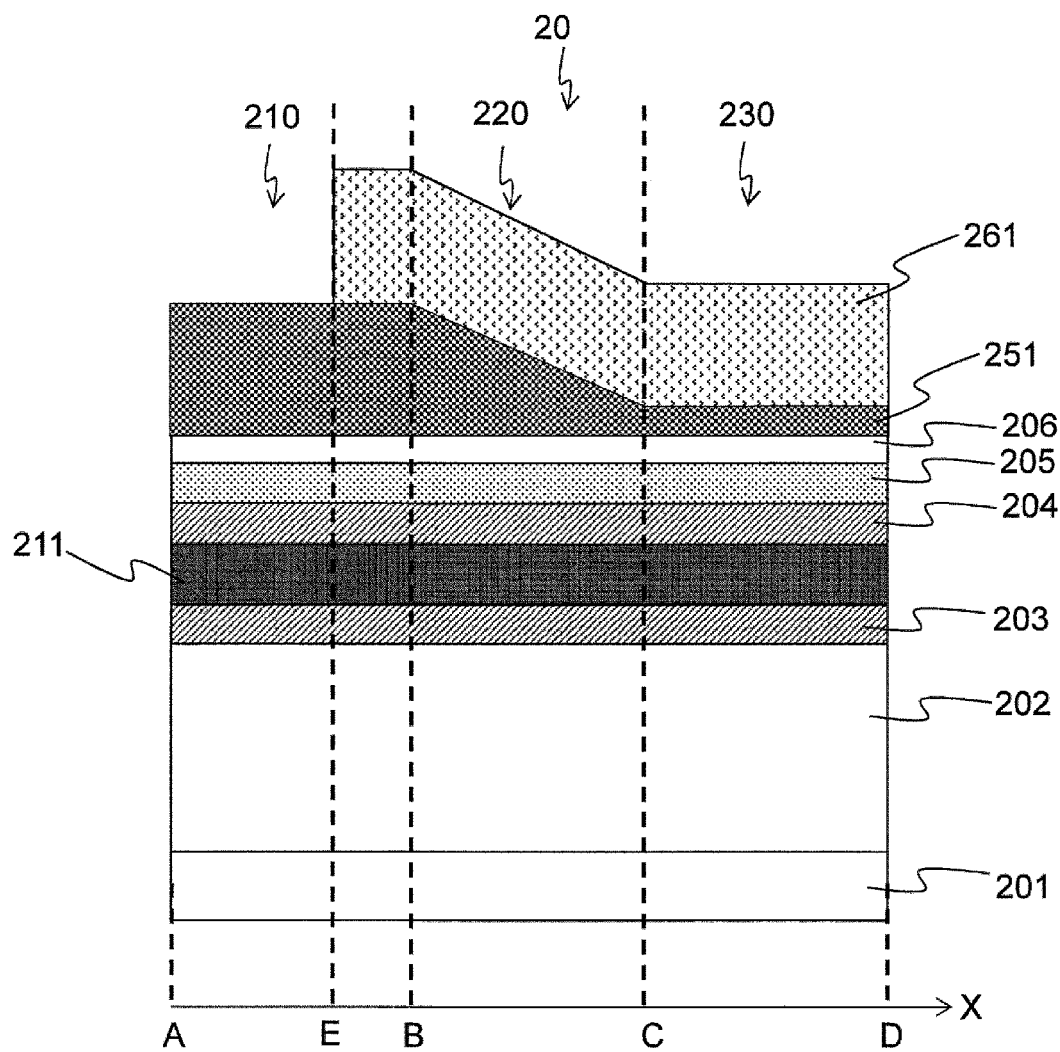
FIG. 13 is a sectional view of a crystal with a $SiO_2$ annealing mask formed thereon in a second embodiment of the present invention.

FIG. 13 is a sectional view of a crystal with a $SiO_2$ annealing mask 261 formed thereon, which is used in the present embodiment, (corresponding to the V-V sectional view in FIG. 5).

The $SiO_2$ annealing mask 261 is formed in such a manner as to cover a boundary between an active region 210 and an intermediate region 220. The $SiO_2$ annealing mask 261 is formed in such a manner as to cover the boundary in a range of 5 μm to the active region 210 side (E in the figure) from the boundary between the active region 210 and the intermediate region 220 (B in the figure).

As in the first embodiment, disordering of a quantum well structure is performed using the $SiO_2$ annealing mask 261.

Figure 14:
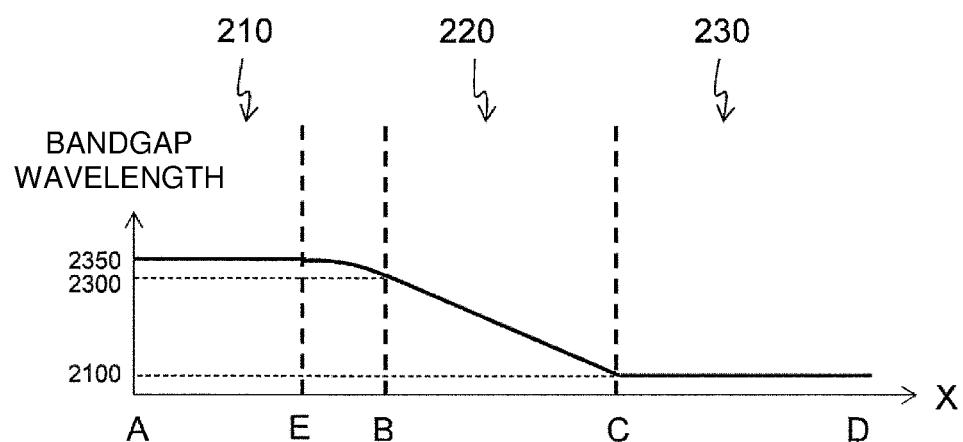
FIG. 14 is a diagram indicating variation in bandgap wavelength of the crystal in which a quantum well structure is disordered in the second embodiment of the present invention.

FIG. 14 illustrates variation in bandgap wavelength of the crystal in which the quantum well structure is disordered in the present embodiment. A bandgap wavelength of the active region 210 is 2350 nm in a range up to 5 μm away from the boundary between the active region 210 and the intermediate region 220 (from A to E in the figure).

The bandgap wavelength decreases from the position (E in the figure) that is 5 μm away from the boundary with the intermediate region 220 to the boundary between the active region 210 and the intermediate region 220 (B in the figure).

Furthermore, as in the first embodiment, the bandgap wavelength decreases from the boundary between the active region 210 and the intermediate region 220 (B in the figure) to a boundary between the intermediate region 220 and a passive region 230 (C in the figure) and becomes 2100 nm in the intermediate region 220.

A bandgap wavelength of the passive region 230 is 2100 nm.

In this way, the method for manufacturing the optical waveguide according to the present embodiment enables continuously varying the bandgap wavelength with no point of bandgap wavelength discontinuity at the boundary between the active region and the intermediate region, by forming an annealing mask in a part of the active region, the intermediate region and the passive region.

Here, in a case where a region in which a semiconductor quantum well structure is not disordered (for example, an active region) is a first region and a region in which the semiconductor quantum well structure is disordered is a second region (for example, a passive region), an optical waveguide in which a bandgap wavelength continuously decreases from a first bandgap wavelength to a second bandgap wavelength between the first region and the second region can be formed by forming a selective growth mask and an opening portion in a region (for example, a part of an intermediate region) between the first region and the second region in a surface of a semiconductor crystal including the semiconductor quantum well structure and performing selective growth and then forming an annealing mask in the second region (for example, the passive region) and a region between the first region and the second region (for example, a part of the active region and a part of the intermediate region) and performing annealing.

Therefore, in a case where light propagates in the optical waveguide according to the present embodiment, it is possible to curb light loss caused by bandgap wavelength discontinuity at the interface between the active region and the intermediate region in addition to light loss caused by a refractive index difference between the active region and the passive region.

In the present embodiment, the active region 210 is subjected to quantum structure disordering, and thus, light emission performance of the active region 210 may deteriorate. This deterioration can be curbed by increasing a thickness of a selectively grown layer because the thickness increase results in an increase in distance from the $SiO_2$ annealing mask 261 to the quantum well structure and thus results in a decrease of crystal defects contributing to quantum well disordering.

On the other hand, the decrease of crystal defects contributing to quantum well disordering results in a decrease in amount of wavelength variation due to the quantum well disordering. Therefore, in a case where the thickness of the selectively grown layer is increased in the present embodiment, the thickness of the selectively grown layer is adjusted in consideration of the light emission performance and the wavelength variation amount of the active region 210.

Third Embodiment

Next, a semiconductor device according to a third embodiment of the present invention will be described.

Figure 15:
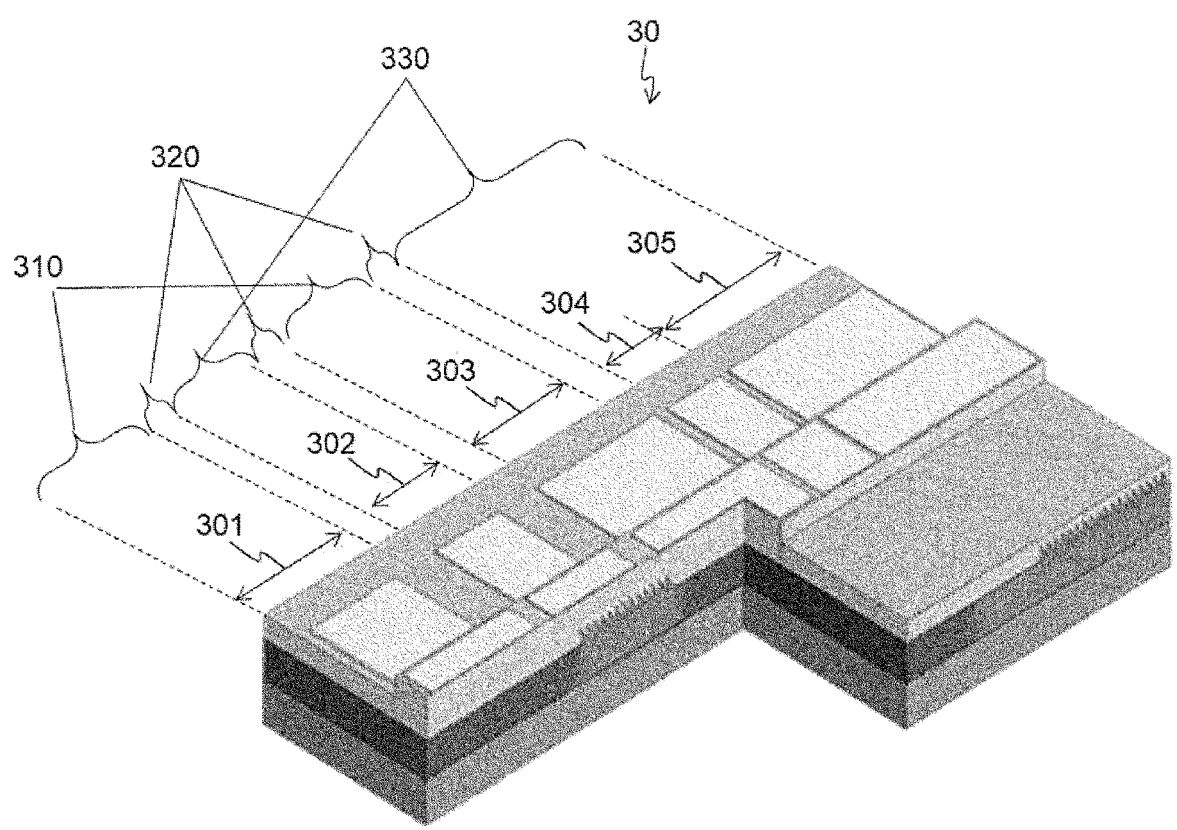
FIG. 15 is a diagram of an outer appearance of a distributed Bragg reflector laser according to a third embodiment of the present invention.
Figure 16:
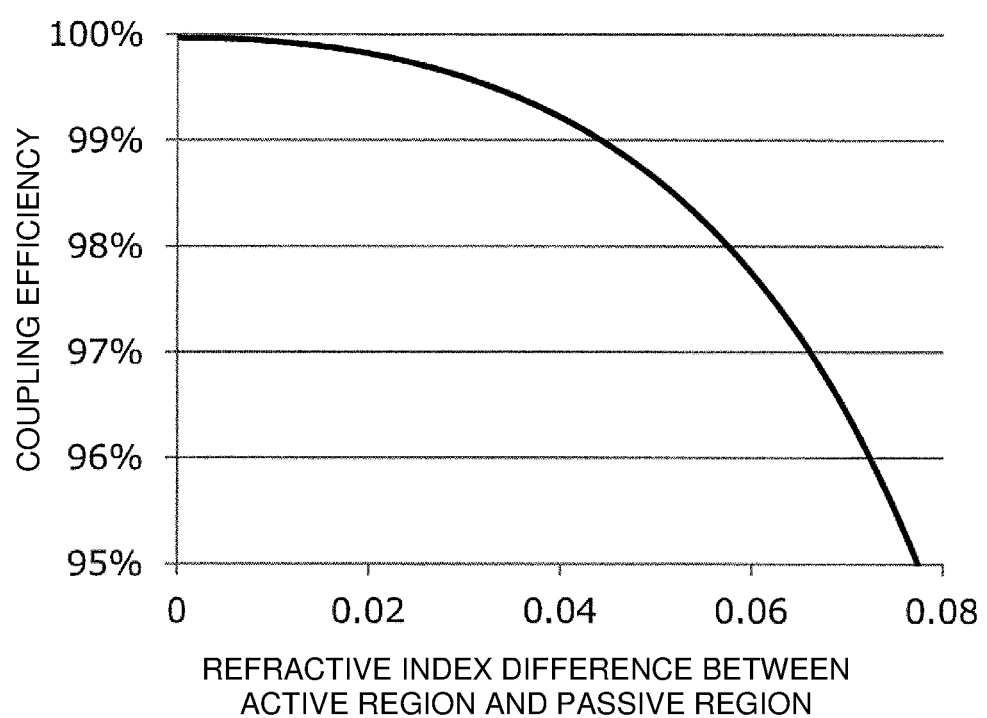
FIG. 16 is a diagram indicating a relationship between a refractive index difference between an active region and a passive region and coupling efficiency.

As the semiconductor device according to the present embodiment, a distributed Bragg reflector (DBR) laser 30 using the waveguide 10 according to the first embodiment will be described. FIG. 15 illustrates the DBR laser 30 using a crystal subjected to quantum well structure disordering.

The DBR laser 3o includes an optical amplification region 301, a DBR reflection region (preceding stage) 302, an active layer region 303, a phase adjustment region 304 and a DBR reflection region (subsequent stage) 305. The active layer region 303 is a region in which light is emitted via current injection and the optical amplification region 301 is a region in which light oscillated via current injection is amplified.

In the quantum well disordered structure, as active regions 310, the active layer region 303 and the optical amplification region 301 are provided, and as passive regions 330, the phase adjustment region 304 and the distributed Bragg reflection regions 302, 305 are provided. Also, an intermediate region 320 is provided at each of a boundary between the optical amplification region 301 and the DBR reflection region (preceding stage) 302, a boundary between the DBR reflection region (preceding stage) 302 and the active layer region 303, and a boundary between the active layer region 303 and the phase adjustment region 304.

A method for manufacturing a DBR reflection structure in the DBR laser 30 will be described. First, in the crystal with the $SiO_2$ annealing mask 161 removed after quantum well disordering being performed in the first embodiment, only the InP selectively grown layer 151 and the InP capping layer 106 are selectively removed via wet etching.

Next, a diffraction grating is formed in a surface of the InGaAsP optical confinement layer with a bandgap wavelength of 1.1 μm via electron beam exposure and wet etching.

Next, a p-type InP cladding layer and a p-type InGaAsP contact layer are sequentially formed via crystal growth using MOVPE growth.

Next, a stripe structure is formed using both dry etching and wet etching using $SiO_2$ used for a mask.

Next, $SiO_2$ is formed on sides of the stripe, and a p-type electrode is formed on the active layer, the optical amplification region, the phase adjustment region, and the distributed Bragg regions.

Next, an n-type electrode is formed on a back surface of the substrate.

Last, the crystal is cleaved and opposite end surfaces are coated with a non-reflective film. In this way, a ridge-type DBR laser structure is manufactured.

For the DBR laser 30, which is an optical semiconductor device according to the present embodiment, favorable laser characteristics such that in a room-temperature continuous operation, a single-mode oscillation wavelength is 2.340 μm, an amount of wavelength variation via current injection to the DBR regions is 5 nm or more, a side-mode suppression ratio in each of all oscillation wavelengths is 40 dB or more and a light output is 1 mW or more are obtained.

As above, the present embodiment enables curbing light loss when light propagates from the active region 310 to the passive region 330, by introducing the intermediate region 320 and thus enables provision of favorable laser characteristics.

Although in the present embodiment, the waveguide 10 according to the first embodiment is used, effects that are similar to or exceed the above are exerted using the waveguide 20 according to the second embodiment.

Although the present embodiment has been described in terms of a DBR laser, the optical waveguide according to embodiments of the present invention is applicable to a structure including an active region and a passive region in the same waveguide, and thus, is clearly applicable even to an SSG-DBR laser using a superstructure grating (SSG) for a diffraction grating or a sampled grating (SG)-DBR laser in which diffraction gratings are periodically disposed. Also, the optical waveguide according to embodiments of the present invention is applicable to optical semiconductor devices in which an optical modulator, an optical switch, etc., are integrated other than lasers.

Also, the present embodiment indicates a laser with a ridge structure and it is clear that the present invention does not depend on the waveguide structure but is applicable to lasers with a pn buried structure formed by processing each of an active region, an intermediate region, and a passive region into a stripe shape and burying opposite sides of such regions in p-type InP and n-type InP alternately or a buried structure formed by burying such regions in semi-insulation InP.

Also, although in the embodiments of the present invention, an InAs/InGaAs quantum well structure that emits light with a wavelength of 2.3 μm is disordered, it is clear that quantum well disordering is applicable not only to this material but also to quantum well structures formed of, e.g., InGaAsP or InGaAlAs, each quantum well structure emitting light with a 1.3 μm band, a 1.55 μm band or a 2 μm band.

Also, in the embodiments of the present invention, $SiO_2$ is used for the selective growth masks and the annealing mask, but another material such as $SiN_x$ or $TiO_2$ may be used.

Although the dimensions of constituent units, components and the like in the optical waveguide, the method for manufacturing the optical waveguide, and the optical semiconductor device according to the first to third embodiments of the present invention have been described, the dimensions in the present invention are not limited to these dimensions but may be any dimensions that allow the respective constituent units, components and the like to function.

INDUSTRIAL APPLICABILITY

Embodiments of the present invention are applicable to semiconductor devices and semiconductor integrated devices such as semiconductor lasers for, e.g., optical communication, environment measurement or medical purposes.

REFERENCE SIGNS LIST 10 optical waveguide
101 substrate
102 cladding layer
110 active region
120 intermediate region
130 passive region
111 (non-disordered) semiconductor quantum well structure (first region)
121 semiconductor quantum well structure disordered in such manner that bandgap wavelength varies
131 disordered semiconductor quantum well structure (first region)

The invention claimed is:
1. A method for manufacturing an optical waveguide comprising a semiconductor quantum well structure, wherein the optical waveguide comprises a first region in which the semiconductor quantum well structure is not disordered, a second region in which the semiconductor quantum well structure is disordered, and a third region provided between the first region and the second region, the method comprising:
   forming a selective growth mask defining an opening portion in the third region in a surface of a crystal including the semiconductor quantum well structure, wherein a ratio between a width of the selective growth mask and a width of the opening portion varies continuously in a direction from the first region toward the second region over all of the third region;
   selectively growing a semiconductor crystal in the opening portion;
   removing the selective growth mask;
   forming an annealing mask in the second region, the third region, and a part of the first region including an interface between the first region and the second region;
   annealing the crystal including the semiconductor quantum well structure with the annealing mask formed thereon; and
   removing the annealing mask.
2. The method according to claim 1, wherein forming the selective growth mask defining the opening portion com- prises forming the selective growth mask and the opening portion in the first region in the surface of the crystal including the semiconductor quantum well structure.

3. The method according to claim 1, wherein in the third region, the width of the selective growth mask decreases in the direction from the first region toward the second region.

4. The method according to claim 1, wherein the semiconductor quantum well structure comprises a group-III material and a group-V material on an InP substrate.

5. The method according to claim 4, wherein the group-V material is As.

6. The method according to claim 1, wherein the semiconductor quantum well structure is provided on an InP substrate and comprises an InAs well layer and an InGaAs barrier layer laminated on each other.

* * * * *